(No Model.)

E. D. MAYO.
CARRIAGE FOR GRAIN SPOUTS.

No. 494,153. Patented Mar. 28, 1893.

Witnesses,
C. E. Van Doren,
Fred Shryer

Inventor,
Edward D. Mayo.
Fig. 4. By Paul A. Merwin
his Attorneys.

THE NORRIS PETERS CO., PHOTO-LITHO., WASHINGTON, D. C.

UNITED STATES PATENT OFFICE.

EDWARD D. MAYO, OF MINNEAPOLIS, MINNESOTA, ASSIGNOR OF ONE-HALF TO THE BARNETT-RECORD COMPANY, OF SAME PLACE.

CARRIAGE FOR GRAIN-SPOUTS.

SPECIFICATION forming part of Letters Patent No. 494,153, dated March 28, 1893.

Application filed August 18, 1892. Serial No. 443,551. (No model.)

*To all whom it may concern:*

Be it known that I, EDWARD D. MAYO, of the city of Minneapolis, county of Hennepin, State of Minnesota, have invented a certain new and useful Carriage for Grain-Spouts, of which the following is a specification.

This invention relates to means for adjustably supporting the ends of grain spouts so as to permit them to be moved freely when not in use, and when they are to be used, to be dropped down so as to make a close fit upon the open receptacle or spout with which they are to connect, and the invention consists generally in providing a spout of this character with a movable carriage arranged to support said spout.

The invention consists further in the construction and combination hereinafter described and particularly pointed out in the claims.

Figure 1:
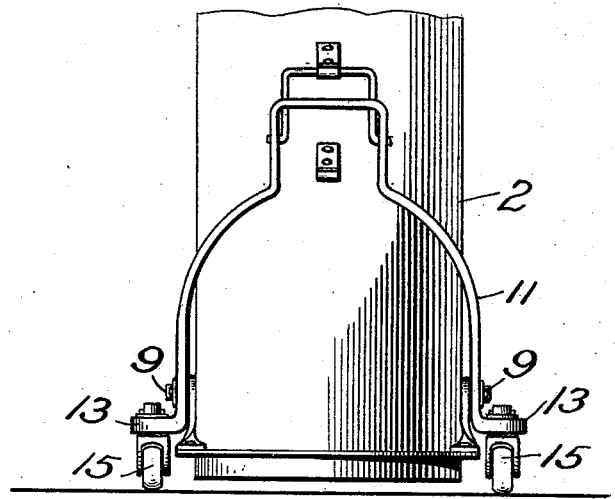
Figure 2:
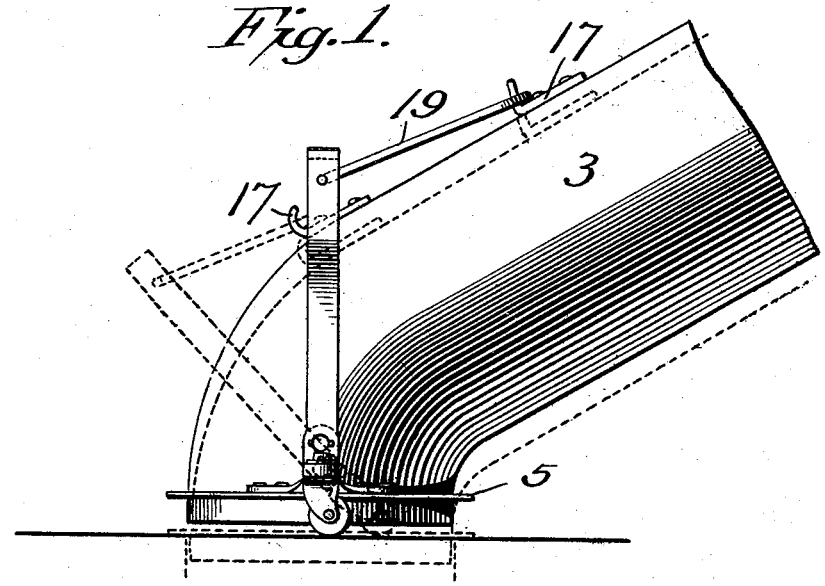
Figure 3:
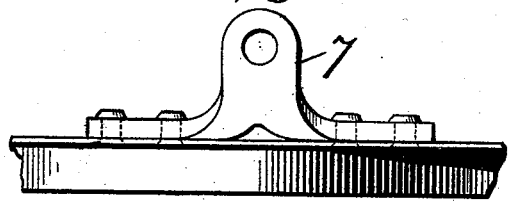

In the accompanying drawings, forming part of this specification; Figure 1 is an elevation of the lower portion of a spout having my invention applied thereto. Fig. 2 is an elevation of the same looking in a direction at right angles to the plane of Fig. 1. Figs. 3 and 4 are details of the flange.

It is customary to provide in elevators and other places movable grain spouts, arranged usually in connection with the hopper scales and adapted to be moved around so as to conduct the grain or other material into any one of a number of bins or spouts. I provide means for supporting the lower ends of said spouts so as to permit them to be moved freely to bring them into any desired position, and at the same time permitting them when they are brought over the opening spout or receptacle with which they are to be used, to be dropped down so as to make a substantially close joint or connection therewith.

In the accompanying drawings, 2 represents the lower end of a spout which may be of any ordinary construction and arrangement. The lower end of this spout is preferably provided with the flange 5 and upon this flange are secured the bearings 7, provided with the bolts or journals 9. A movable carriage is secured to the lower end of the spout, said carriage being adapted to support the end of the spout and hold it away from the floor or plane upon which the carriage travels. This carriage is so constructed that when the end of the spout has been brought over an opening or over another spout, or a receptacle, with which connection is to be made, that the carriage may be moved so as to permit the spout to drop down preferably by its own weight and make a close connection with said opening, spout or receptacle. I may use any suitable movable carriage for this purpose. As here shown, I have provided the lower end of the spout with the flange 5, and also with the lugs or bearings 7, in which are secured the bolts or journals 9. The carriage consists of the bail 11, provided with the horizontal lower ends 13, in which are secured the pivoted casters or rolls 15. Upon the upper surface of the spout are secured the lugs 17, and the carriage is provided with the locking loop 19. When the pivoted carriage is turned into the substantially perpendicular position shown in Figs. 1 and 2, with the loop 19 in engagement with the upper lug 17, the lower end of the spout will be lifted free from the floor or plane upon which the rolls 15 rest and will be supported by said rolls. When the end of the spout has been brought over an opening or an end of another spout or receptacle, with which connection is to be made, the loop 19 is raised from the lug 17 and the carriage is swung down into the position shown by the dotted lines in Fig. 2, thus permitting the lower end of the spout to drop down and bring its flange 5 against the floor or against the wall of the opening in the spout or receptacle with which connection is to be made. When the spout is used the grain or material will be prevented from escaping under the lower end of the spout. The dust will also be prevented from escaping under the end of the spout and the frequent sweeping of the floor over which the spout is arranged will be avoided.

I claim as my invention—

1. The combination with a movable spout, of a carriage arranged on the lower end thereof to travel upon the floor and in itself vertically adjustable, whereby said lower end of the spout may be raised or lowered, as and for the purpose specified.

2. The combination with a movable spout, of a vertically adjustable carriage arranged to support the lower end of said spout.

3. The combination with the movable spout, of a vertically adjustable carriage secured upon the lower end of said spout and arranged to support the same.

4. The combination with the spout 3, of the adjustable carriage arranged thereon and comprising the pivoted bail 11, having the supporting rolls 15, and means for holding said bail, substantially as described.

5. The combination with the spout 3, provided with the flange 5, the lugs 7 and journals 9, of the bail 11, pivoted upon said journals 9 and provided with the pivoted rolls 15, the locking hook 19 and the lugs 17 upon said spout, substantially as described.

In testimony whereof I have hereunto set my hand this 9th day of August, 1892.

EDWARD D. MAYO.

In presence of—
A. C. PAUL,
F. S. LYON.